United States Patent [19]

Ushio et al.

[11] Patent Number: 5,351,651
[45] Date of Patent: Oct. 4, 1994

[54] ARTIFICIAL SEA-WATER

[75] Inventors: Kazumichi Ushio, Nishinomiya; Takaichi Kinoshita, Kobe, both of Japan

[73] Assignee: Senju Pharmaceutical Co., Ltd., Osaka, Japan

[21] Appl. No.: 83,234

[22] Filed: Jun. 29, 1993

[30] Foreign Application Priority Data

Jun. 30, 1992 [JP] Japan ................................. 4-173123

[51] Int. Cl.$^5$ ............................................. A01K 63/04
[52] U.S. Cl. ..................................................... 119/231
[58] Field of Search ........................................ 119/231

[56] References Cited

U.S. PATENT DOCUMENTS 3,623,455 11/1971 Kelley et al. ......................... 119/231
3,886,904 6/1975 King ..................................... 119/231
4,962,728 10/1990 Highfill ................................ 119/231

FOREIGN PATENT DOCUMENTS 1234226 6/1971 United Kingdom .
1256014 12/1971 United Kingdom .

*Primary Examiner*—Robert P. Swiatek
*Attorney, Agent, or Firm*—Millen, White, Zelano & Branigan

[57] ABSTRACT

An improved composition for preparing artificial sea-water comprises an electrolyte mixture which, upon being dissolved in a proper amount of water, forms an aqueous solution which simulates natural sea-water in composition except that it contains one or more boron compounds within a concentration range from 0.002 to 0.05 w/v % calculated as boron. The pH stability of an artificial sea-water is improved by adding one or more boron compounds thereto.

13 Claims, No Drawings

ARTIFICIAL SEA-WATER

BACKGROUND OF THE INVENTION

This invention relates to a composition and method for preparing an artificial sea-water to be used for keeping or cultivating animals and plants living in the sea-water.

When one is going to keep or cultivate organisms living in the sea-water, or to investigate, for example, their ecology, it is desirable to use natural sea-water. In recent years, however, because of the spreading environmental pollution of various kinds, it is recognized that many substances that originally were not present are now present in the natural sea-water, and that the proportions of the components of the sea-water may vary. Thus, it is no longer always proper to keep, cultivate or investigate sea-living organisms using such natural sea-water. On the other hand, when sea-living organisms are kept or investigated for a long period of time in a closed environment such as a water tank, there may occur problems, e.g. changes in the pH of the sea-water and development of diseases. Consequently, it is necessary to continually exchange the sea-water in the tank with a fresh supply. However, there are situations in which the collection of the natural sea-water is disturbed due to rough weather or in which it is difficult to obtain the natural seawater due to the remoteness of the location form the sea. In these circumstances, artificial sea-waters whose composition is similar to the natural sea-water have come to be used for handling sea-living organisms instead of the natural sea-water, and such artificial sea-waters are becoming more and more popular.

Natural sea-water contains about 35 g/kg of various inorganic salts. The major elemental composition of inorganic salts in natural sea-water is shown in Table 1 below.

TABLE 1

| Major elemental composition of the natural sea-water | |
|---|---|
| Elements | g/L |
| Sodium | 8–13 |
| Magnesium | 0.9–1.6 |
| Calcium | 0.3–0.5 |
| Potassium | 0.3–0.5 |
| Chlorine | 15–24 |
| Sulfur | 0.7–1.2 |
| Bromine | 0.04–0.08 |
| Carbon | 0.02–0.04 |

(Kaiyo Kansoku Shishinsho, p. 145, Ed. by the Weather Agency, Nihon Kaiyo Gakkai, Tokyo, 1990)

Among the above, sulfur occurs mainly in the form of sulfonate ion, and carbon mainly in the form of carbonate ion.

Besides these elements, it is known that the natural sea-water also contains, although as minor element components, metal ions such as lithium, strontium, barium, titanium, molybdenum, tungsten, manganese, iron, cobalt, nickel, copper, zinc and aluminium ions, and ammonium ion as well as anions derived from boron, iodine and fluorine.

Thus, the artificial sea-waters used for keeping sea-living organisms have heretofore been prepared so that they may have a composition as similar as possible to that of the natural sea-water.

Compositions for preparing artificial sea-waters are usually prepared in the form of a powder, granules or liquid, and they are dissolved or diluted with water prior to use. However, such problems have been pointed out that, when used for keeping organisms in a closed environment such as a water tank, the sea-water produced therefrom exhibits an instability in quality, e.g. a rapid change in pH, a shortage of dissolved oxygen and a subtle divergence in specific gravity from the natural sea-water, and, in addition, promotes the to development of diseases.

Among these problems, the most important are changes in pH, which is due to the lack of buffering capacity of the artificial sea-waters, and development of diseases. Thus, the lack of buffering capacity is a factor leading to pH lowering of the artificial sea-waters, which lowering is caused by organic acids and nitrous acid derived from the excreta of the sea-living organisms and remnants of feed drifting in the water. This lowering in the pH causes suppression of the microorganismic breakdown of the excreta and the remnant of feed, and, in addition, leads to the development of diseases. Considering the time and labor as well as economics involved, it is not feasible to frequently exchange the artificial sea-water in response to the changes in quality of the water in order to maintain the rearing environment.

Because the artificial sea-waters so far used have the many problems described above, the inventors have made an attempt to solve these problems and develop a composition for preparing an artificial sea-water more suitably used for keeping, cultivating and investigating sea-living organisms.

SUMMARY OF THE INVENTION

As a result, the inventors have found out that the disadvantage of the conventional artificial sea-water can be improved by increasing an appropriate amount the boron compounds such as boric acid or borates, therein, whereby the buffering capacity can be increased and pH changes suppressed. The addition of boron compounds was also found effective in reducing the development of diseases in sea-living organisms. The present invention has been accomplished based on these findings.

The present invention relates to a composition for preparing an artificial sea-water which composition contains one or more boron compounds, more specifically to a composition comprising an electrolyte mixture which, by being dissolved in an appropriate amount of water, forms an aqueous solution which otherwise simulates the natural sea-water in composition except that it contains one or more boron compounds which imparts thereto a total boron concentration of from 0.002 to 0.05 w/v %. One process aspect of this invention relates to method for improving the pH stability of a conventional artificial sea-water which comprises adding to said artificial sea-water one or more boron compounds in an amount which imparts thereto a total boron concentration of from 0.002 to 0.05 w/v %. In another process aspect, this invention relates to a method for keeping or cultivating sea-living organisms in an artificial sea-water, which comprises employing an artificial seawater which contains one or more boron compounds in an amount which imparts to the sea-water a total boron concentration of from 0.002 to 0.05 w/v %.

DETAILED DISCUSSION

The composition for preparing an artificial sea-water according to the present invention is prepared by adding one or more boron compounds to a fundamental electrolyte mixture for simulating the natural sea-water. As one of the minor components, boron is contained in the natural sea-water in an amount of 0.00445 g/kg [Kaiyogaku Koza 6, Ed. by Sumio Horibe, Tokyo Daigaku Shuppankai, p.59 (1975)]. Assuming that the specific gravity of the ocean sea-water to fall in the range from 1.02 to 1.031 [Bunseki Kagaku Jiten (Vortaro de Analiza Kemio), 1st Ed.,p.297 (1971), Kyoritsushuppan, Tokyo], the above content corresponds to a concentration (g/l) of approximately 0.00046 w/v %.

We analyzed conventional, commercially available artificial sea-waters for boron content by atomic absorption photometry. As a result, it was found that the boron content of most of the analyzed conventional artificial sea-water was approximately the same level as that of the natural sea-water and that, for those with higher levels, the content was at most the amount considered to have originated from boron compounds contaminating the various inorganic salts that constitute the composition (see Table 2 below).

TABLE 2

Boron content of commercially available artificial sea-waters

| Artificial sea-water | Boron (w/v %) |
| --- | --- |
| A | 0.001 |
| C | 0.00057 |
| D | 0.0011 |
| E | 0.0004 |
| F | 0.0004 |
| G | 0.0002 |

(Measured by atomic absorption photometry)

The artificial sea-water according to the present invention, when compared with these conventional artificial sea-waters, is characterized by much higher boron levels.

Thus, the composition for preparing an artificial sea-water of the present invention comprises an electrolyte mixture which, by being dissolved in a proper amount of water, can form an aqueous solution which simulates the natural sea-water in composition except that it contains one or more boron compounds which provide a boron concentration of from 0.002 to 0.05 w/v %, preferably from 0.005 to 0.02 w/v %, and particularly preferably from 0.005 to 0.01 w/v %. By the phrase, "simulate natural sea-water", is meant that the major elemental composition of the prepared artificial sea-water falls substantially within the range of the major elemental composition of the natural sea-water shown in Table 1, and most preferably it is further meant that the minor elemental composition of the prepared artificial sea-water also resembles that of the natural sea-water.

Thus, the composition according to the present invention is constituted so that an artificial sea-water prepared contains one or more boron compounds in a total amount which provides a boron concentration of from 0.002 to 0.05 w/v %, preferably from 0.005 to 0.02 w/v %, and most preferably from 0.005 to 0.01 w/v %.

A method for improving the pH stability of a conventional artificial sea-water whose boron content is less than 0.002 w/v % is also provided which comprises adding thereto one or more boron compounds in such an amount as to raise the boron concentration to from 0.002 to 0.05 w/v %, preferably from 0.005 to 0.02 w/v %, and most preferably from 0.005 to 0.01 w/v %.

Provided further is a method for keeping or cultivating sea-living organisms in an artificial sea-water, characterized in that said artificial sea-water contains one or more boron compounds within a total concentration range from 0.002 to 0.05 w/v % calculated as boron, preferably from 0.005 to 0.02 w/v %, and particularly preferably from 0.005 to 0.01 w/v %.

Boron compounds which may be used conveniently to prepare the composition for preparing an artificial sea-water according to the present invention include, for example, boric acid, sodium borate, potassium borate, lithium borate, ammonium borate and manganese borate. One or more of these boron compounds are added in such an amount that, when an artificial sea-water is prepared, their total content calculated as boron will fall within the aforementioned concentration range.

The composition for preparing an artificial sea-water according to the present invention may contain, in addition to, the aforementioned inorganic ions, in the forms of sodium chloride, potassium chloride, sodium bromide, potassium bromide, calcium chloride, magnesium chloride, sodium sulfate, sodium carbonate and magnesium sulfate, for example, and may contain other, minor components in the forms of, for example, inorganic salts. These salts are preferably contained in the composition properly so that, when the composition is dissolved in water, the resulting aqueous solution will simulate the natural sea-water as closely as possible in its components and respective concentrations thereof.

When an artificial sea-water is prepared chiefly for an investigation of sea-living organisms, depending upon its purpose, other salts and minor components or reagents can be included, or its concentrations of salts may differ from those of natural sea-water.

The composition for preparing an artificial sea-water according to the present invention may be in any forms conventionally utilized in constituting compositions for artificial sea-water, such as powder, granules and tablets. In preparation, any convenient means utilized in such fields as medicines, agricultural chemicals and the like can be used. Although as a powder it dissolves most easily in water to prepare an artificial sea-water, the form of granules can also be employed to prevent fine powder from scattering.

The composition for preparing an artificial sea-water according to the present invention is preferably contained in a moisture-proof container, and, for example, use of a bag made of moisture-proof synthetic resins such as polyethylene, polypropylene and the like or aluminium-laminated such resins is preferred. Although a metal container may also be used, it is desired in such a case that the inner surface thereof is coated with, for example, a synthetic resin in order to avoid introduction of trace amount of metal contaminants.

As will be shown below, artificial sea-water prepared with a composition according to the present invention has a strong buffering capacity and is free of toxicity, and, moreover, it can suppress the development of diseases in sea-living organisms. Therefore, it can be used advantageously for keeping or cultivating sea-living animals and plants, or investigating, for example, their ecology.

The present invention is described in further detail in the following Examinations and Examples, and the effect thereof is demonstrated by the Examinations. However, they are provided solely for the purpose of illustration and, therefore, should not be regarded as restricting the scope of the present invention.

Examinations

The toxicity to sea-living organisms of artificial sea-water prepared from a composition according to the present invention was examined by an bioassay using the fertilization/development process of sea urchins as a criterion as described in the Examination below. The bioassay using the fertilization/development process of sea urchins as a criterion is reported by Kobayashi et al. [Seitaikagaku, 18: 1–7 (1986)]. On the other hand, Kubo et al.[J. Antibact. Antifung. Agents, 12: 551–559 (1984)] describes that there is a correlation in tolerance to toxic agents between fertilization/development of sea urchin eggs and sea-living fish, and that, although the sensitivity varies between agents, toxicity of agents is observed to be lower to fish than to the fertilization/development of sea urchin eggs. Thus, the inventors employed, as a criterion for estimation of toxicity of artificial sea-water, the bioassay using fertilization/development process of sea urchins.

Examination 1

Influence of boron on fertilization/development of sea urchins.

A fundamental artificial sea-water with composition close to the aforementioned major elemental composition of the natural sea-water, and corresponding artificial sea-waters containing boron at different concentrations were prepared. Optimal concentration of boron was estimated by the bioassay based on the observation of the influence on fertilization/development of purple sea urchins (*Anthocidaris crassispina*).

The purple sea urchins used in the examination were collected in a shallow sea of Awaji Island, Hyogo, Japan. The eggs of the purple sea urchins were prepared in the form of 200 eggs/10 mL suspensions with artificial sea-waters containing different concentrations of boron, and insemination was attained by adding a drop of sperm cells diluted with a proper amount of the sea-water. Ten minutes after insemination, the ratio of formation of fertilization membrane was microscopically observed and defined as the fertilization ratio. In addition, after allowing to stand for 24 hours at room temperature after the insemination, development of pluteus from the fertilized eggs was microscopically observed and defined as the development ratio of the purple sea urchins.

Table 3 shows the boron concentrations and the corresponding fertilization/development ratios. Boron did not exert any influence on fertilization up to the addition of 0.05 w/v %. For pluteus development, no influence was observed by the addition of boron up to 0.01 w/v %, whereas the development ratio was lowered by 10% by the addition of boron at 0.02 w/v %, and no development was observed by the addition of 0.05 w/v %.

Table 3

Influence of boron on fertilization/development of Purple sea urchins

| Boron concentration (w/v %) | Fertilization ratio (%) | Development ratio (%) |
|---|---|---|
| 0 | 100 | 100 |
| $5 \times 10^{-4}$ | 100 | 98 |
| $1 \times 10^{-3}$ | 100 | 99 |
| $2 \times 10^{-3}$ | 99 | 99 |
| $5 \times 10^{-3}$ | 100 | 98 |
| $1 \times 10^{-2}$ | 100 | 100 |
| $2 \times 10^{-2}$ | 99 | 90 |
| $5 \times 10^{-2}$ | 100 | 0 |
| $1 \times 10^{-1}$ | 0 | 0 |

Another examination was carried out in the same manner using red sea urchins (*Pseudocentrotus depressus*), giving substantially the same results as those obtained above from the purple sea urchins.

Thus, it is known that boron compounds have no toxicity to fertilization/development of sea urchins when their total concentration is not more than 0.02 w/v % calculated as boron. In addition, considering that the tolerance to toxic agents is higher in fishes compared with sea urchins, it is estimated that, to some kind or sea-living organisms, boron compounds may not be toxic even when their total concentration calculated as boron is 0.05 w/v % in an artificial sea-water prepared therefrom.

Examination 2

With the artificial sea-waters 1 and 2 which were prepared according to Examples 1 and 2 described below, bioassay was carried out by the same method as described in Examination 1 in order to evaluate toxicity. A commercially available artificial sea-water (a) was used as a control.

As a result, as shown in Table 4, the three artificial sea-waters examined were equivalent to the natural sea-waters far as the fertilization ratio is concerned. However, development of pluteus was not observed with the commercially available artificial sea-water (a), whereas almost the same development ratio of pluteus as with the natural sea-water was observed with the artificial sea-waters 1 and 2.

TABLE 4

Influence on fertilization/development of Red Sea Urchins

| Sea-water | Fertilization ratio (%) | Development ratio (%) |
|---|---|---|
| Artificial sea-water 1 | 100 | 98 |
| Artificial sea-water 2 | 99 | 99 |
| Natural sea-water | 100 | 98 |
| Control (a) | 95 | 0 |

Thus, the artificial sea-waters prepared using the compositions according to the present invention showed no toxicity.

Examination 3

The entire composition produced in Example 2 described below was put into a water tank containing 50 L of deionized water and mixed well to prepare artificial sea-water 2. Maintaining the temperature of the water at 25° C. and with air bubbling, 25 blue damselfish were kept in the water tank, and the time profile of the pH of the artificial sea-water and surviving ratio of the blue damselfish were observed. As a control, a commercially available artificial sea-water (a) was used after adjusted to have substantially the equivalent tonicity.

As shown in Table 5, in a 2-week observation period, the pH of the control artificial sea-water (a), in which the fish were kept, dropped from pH 9.0 to 7.5, whereas the pH of the artificial sea-water 2, in which the fish were kept, showed only a slight change from pH 8.3 to 8.0.

TABLE 5

| Artificial sea-water | Changes in pH pH | | |
|---|---|---|---|
| | Initial | 1 week | 2 weeks |
| Artificial sea-water 2 | 8.3 | 8.1 | 8.0 |
| Control (a) | 9.0 | 7.8 | 7.5 |

Moreover, as shown in Table 6, the survival ratio of the blue damselfish was higher in the artificial sea-water 2 compared with control artificial sea-water (a). In addition, white spot disease was observed to develop in the blue damselfish kept in the control artificial sea-water (a) after 1-week, whereas development of white spot disease was not observed in the blue damselfish kept in the artificial sea-water 2.

TABLE 6

| Surviving ratio of Blue Damselfish | |
|---|---|
| Artificial sea-water | Surviving ratio |
| Artificial sea-water 2 | 100 |
| Control (a) | 60 |

Thus, it has been demonstrated that the composition for preparing an artificial sea-water according to the present invention can advantageously be used to prepare an artificial sea-water for keeping, cultivating or investigating sea-living organisms.

EXAMPLE 1

20 g of boric acid, 10 g of sodium borate, 1000 g of sodium chloride, 500 g of magnesium chloride, 70 g of calcium chloride, 4 g of sodium bromide, 35 g of potassium chloride, 1 g of sodium hydrogen carbonate, 180 g of sodium sulfonate and 52 mg of a mixed powder of minor element components (a mixed powder comprising 10 g of lithium chloride, 40 mg of titanium tetrachloride, 9 mg of manganese chloride, 48 mg of ferric chloride, 80 mg of zinc chloride, 200 mg of ammonium molybdate and 21 mg of sodium tungstate) are sufficiently admixed and the mixture is contained in a polyethylene bag.

For preparing the artificial sea-water, the composition is dissolved in deionized water to make 50 L.

EXAMPLE 2

6 g of boric acid, 2 g of sodium borate, 1000 g of sodium chloride, 500 g of magnesium chloride, 70 g of calcium chloride, 4 g of sodium bromide and 52 mg of a mixed powder of minor element components (a mixed powder comprising 10 g of lithium chloride, 40 mg of titanium tetrachloride, 9 mg of manganese chloride, 48 mg of ferric chloride, 80 mg of zinc chloride, 200 mg of ammonium molybdate and 21 mg of sodium tungstate) are sufficiently admixed and the mixture is contained in a polyethylene bag (agent A). Separately, 35 g of potassium chloride, 10 g of sodium hydrogen carbonate and 180 g of sodium sulfate are sufficiently admixed and the mixture is contained in another polyethylene bag (agent B).

For preparing the artificial sea-water, both agents are simultaneously dissolved in deionized water to make 50 L.

EXAMPLE 3

20 g of boric acid, 10 g of potassium borate, 1000 g of sodium chloride, 500 g of magnesium chloride, 70 g of calcium chloride, 4 g of sodium bromide, 35 g of potassium chloride, 180 g of sodium sulfate, 5 g of sodium hydrogen carbonate and 52 mg of a mixed powder of minor element components (a mixed powder comprising 10 g of lithium chloride, 40 mg of titanium tetrachloride, 9 mg of manganese chloride, 48 mg of ferric chloride, 80 mg of zinc chloride, 200 mg of ammonium molybdate and 21 mg of sodium tungstate) are sufficiently admixed and then contained in a polyethylene container.

For preparing the artificial sea-water, the composition is dissolved in deionized water to make 50 L.

What is claimed is:

1. A composition for preparing an artificial sea-water comprising an electrolyte mixture which, by being dissolved in an appropriate amount of water, forms an aqueous solution which otherwise simulates the natural seawater in composition except that it contains one or more boron compounds which impart thereto a total boron concentration of from 0.002 to 0.05 w/v %.

2. A composition according to claim 1, which comprises as a source of said one or more boron compounds, one or more compounds selected from the group consisting of boric acid, sodium borate, potassium borate, manganese borate, lithium borate and magnesium borate.

3. A composition according to claim 1, in the form of a powder, granules or tablets.

4. A composition according to claim 1, wherein the boron concentration is from 0.005 to 0.02 w/v %.

5. A composition according to claim 1, wherein the boron concentration is from 0.005 to 0.01 w/v %.

6. A composition according to claim 5, wherein the boron compounds are selected from the group consisting of boric acid, sodium borate, potassium borate, manganese borate, lithium borate and magnesium borate.

7. A composition according to claim 1, as a powder.

8. A composition according to claim 1, wherein the powder is packaged in a moisture proof plastic container.

9. A method for improving the pH stability of an artificial sea-water comprising adding to said artificial sea-water one or more boron compounds in an amount which imparts thereto a total boron concentration of from 0.002 to 0.05 w/v %.

10. A method for keeping or cultivating a sea-living organism in an artificial seawater, which comprises employing an artificial seawater which contains one or more boron compounds in an amount which imparts to the sea water a total boron concentration of from 0.002 to 0.05 w/v %.

11. A method according to claim 10, wherein the boron concentration is from 0.005 to 0.01 w/v %.

12. A method according to claim 11, wherein the boron compounds are selected from the group consisting of boric acid, sodium borate, potassium borate, manganese borate, lithium borate and magnesium borate.

13. A method according to claim 10, wherein the organism is a fish.

* * * * *